United States Patent [19]

Leatherman et al.

[11] Patent Number: 4,892,779

[45] Date of Patent: Jan. 9, 1990

[54] MULTILAYER ARTICLE OF MICROPOROUS AND SUBSTANTIALLY NONPOROUS MATERIALS

[75] Inventors: Dennis D. Leatherman, Pittsburgh, Pa.; Richard A. Schwarz, Akron, Ohio

[73] Assignee: PPG Industries, Inc., Pittsburgh, Pa.

[21] Appl. No.: 286,584

[22] Filed: Dec. 19, 1988

Related U.S. Application Data

[63] Continuation-in-part of Ser. No. 169,654, Mar. 18, 1988, abandoned, which is a continuation-in-part of Ser. No. 138,980, Dec. 29, 1987, abandoned.

[51] Int. Cl.$^4$ .............................. B32B 3/26; B32B 5/22
[52] U.S. Cl. .................... 428/220; 428/315.5; 428/317.9; 428/318.4; 428/319.3; 428/319.9; 428/402; 428/461; 428/515; 428/200; 428/206; 428/331
[58] Field of Search ............... 428/315.5, 317.9, 319.9, 428/318.4, 319.3, 220, 402, 461, 515; 264/288.8

[56] References Cited

U.S. PATENT DOCUMENTS

| | | | |
|---|---|---|---|
| 2,799,828 | 3/1974 | Takashi et al. | 156/229 |
| 2,940,830 | 6/1960 | Thornhill | 23/182 |
| 3,351,495 | 11/1967 | Larsen et al. | 136/146 |
| 3,634,184 | 1/1972 | Wang | 161/159 |
| 4,539,256 | 9/1985 | Shipman | 428/315.5 |
| 4,582,753 | 4/1986 | Duncan | 428/315.5 |
| 4,648,417 | 3/1987 | Johnson et al. | 134/105 |
| 4,681,750 | 7/1987 | Johnson et al. | 423/339 |
| 4,704,323 | 11/1987 | Duncan et al. | 428/315.5 |
| 4,734,229 | 3/1988 | Johnson et al. | 264/40.6 |
| 4,758,462 | 7/1988 | Park et al. | 428/315.5 |
| 4,780,364 | 10/1988 | Wade et al. | 428/315.5 |

FOREIGN PATENT DOCUMENTS

| | | |
|---|---|---|
| 0254923 | 2/1988 | European Pat. Off. |
| 0281701 | 9/1988 | European Pat. Off. |
| 61-209129 | 9/1986 | Japan |

Primary Examiner—Ellis P. Robinson
Assistant Examiner—James J. Seidleck
Attorney, Agent, or Firm—George D. Morris

[57] ABSTRACT

A multilayer article comprises at least one layer of substantially nonporous material fusion bonded in the absence of extrinsic intervening adhesive to at least one layer of microporous material comprising a matrix consisting essentially of linear ultrahigh molecular weight polyolefin, a large proportion of finely divided, water-insoluble filler at least about 50 percent of which is siliceous, and interconnecting pores.

31 Claims, No Drawings

MULTILAYER ARTICLE OF MICROPOROUS AND SUBSTANTIALLY NONPOROUS MATERIALS

This application is a continuation-in-part of application Ser. No. 169,654, filed Mar. 18, 1988 now abandoned, which is a continuation-in-part of application Ser. No. 138,980 now abandoned, filed Dec. 29, 1987.

The present invention is directed to multilayer articles comprising microporous material characterized by a matrix consisting essentially of essentially linear ultrahigh molecular weight polyolefin, a very large proportion of finely-divided particulate filler, and a high void content, bonded to substantially nonporous material.

Accordingly, one embodiment of the invention is a multilayer article comprising material which is impervious to the passage of gas and bacteria fusion bonded in the absence of extrinsic intervening adhesive to microporous material comprising (a) a matrix consisting essentially of essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (b) finely divided particulate substantially water-insoluble siliceous filler distributed throughout the matrix, the filler constituting from about 50 percent to about 90 percent by weight of the microporous material, and (c) a network of interconnecting pores communicating throughout the microporous material, the pores before fusion bonding constituting at least about 35 percent by volume of the microporous material.

Another embodiment of the invention is a multilayer article comprising at least one layer of substantially nonporous material fusion bonded in the absence of extrinsic intervening adhesive to at least one layer of microporous material comprising (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (b) finely divided particulate substantially water-insoluble filler, of which at least about 50 percent by weight is siliceous, distributed throughout the matrix, the filler constituting from about 50 percent to about 90 percent by weight of the microporous material, and (c) a network of interconnecting pores communicating throughout the microporous material, the pores before fusion bonding constituting at least about 35 percent by volume of the microporous material.

The thickness across the microporous material may vary widely, but usually it is in the range of from about 0.03 to about 4 millimeters. In many cases it is in the range of from about 0.07 to about 1.5 millimeters. From about 0.18 to about 0.6 millimeter is preferred.

Inasmuch as ultrahigh molecular weight (UHMW) polyolefin is not a thermoset polymer having an infinite molecular weight, it is technically classified as a thermoplastic. However, because the molecules are essentially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of the microporous material.

As indicated earlier, the intrinsic viscosity of the UHMW polyethylene is at least about 18 deciliters/gram. In many cases the intrinsic viscosity is at least about 19 deciliters/gram. Although there is no particular restriction on the upper limit of the intrinsic viscosity, the intrinsic viscosity is frequently in the range of from about 18 and 39 deciliters/gram. An intrinsic viscosity in the range of from about 18 to about 32 deciliters/gram is preferred.

Also as indicated earlier the intrinsic viscosity of the UHMW polypropylene is at least about 6 deciliters/gram. In many cases the intrinsic viscosity is at least about 7 deciliters/gram. Although there is no particular restriction on the upper limit of the intrinsic viscosity, the intrinsic viscosity is often in the range of from about 6 to about 18 deciliters/gram. An intrinsic viscosity in the range of from about 7 to about 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is, in its entirety, incorporated herein by reference.

The nominal molecular weight of UHMW polyethylene is empirically related to the intrinsic viscosity of the polymer according to the equation:

$$M = 5.37 \times 10^4 [\eta]^{1.37}$$

where M is the nominal molecular weight and $[\eta]$ is the intrinsic viscosity of the UHMW polyethylene expressed in deciliters/gram. Similarly, the nominal molecular weight of UHMW polypropylene is empirically related to the intrinsic viscosity of the polymer according to the equation:

$$M = 8.88 \times 10^4 [\eta]^{1.25}$$

where M is the nominal molecular weight and $[\eta]$ is the intrinsic viscosity of the UHMW polypropylene expressed in deciliters/gram.

The essentially linear ultrahigh molecular weight polypropylene is most frequently essentially linear ultrahigh molecular weight isotactic polypropylene. Often the degree of isotacicity of such polymer is at least about 95 percent, while preferably it is at least about 98 percent.

Sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred thermoplastic organic polymers which may optionally be present are low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc, or the like. It is our experience that usually at least about 50 percent UHMW polyolefin, based on the weight of the matrix, will provide the desired properties to the microporous material. Often at least about 70 percent by weight of the matrix is UHMW polyolefin. In many cases the other thermoplastic organic polymer is substantially absent.

The finely divided substantially water-insoluble siliceous filler used in the present invention is particulate. As present in the microporous material, the siliceous filler may be in the form of ultimate particles, aggregates of ultimate particles, or a combination of both. In most cases, at least about 90 percent by weight of the siliceous filler used in preparing the microporous material has gross particle sizes in the range of from about 5 to about 40 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably at least about 90 percent by weight of the siliceous filler has gross particle sizes in the range of from about 10 to about 30 micrometers. It is expected that the sizes of filler agglomerates will be reduced during processing of the ingredients to prepare the microporous material. Accordingly, the distribution of gross particle sizes in the microporous material may be smaller than in the raw siliceous filler itself. ASTM C 690-80 is, in its entirety, incorporated herein by reference.

Examples of suitable siliceous fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Silica and the clays are the Preferred siliceous fillers. Of the silicas, precipitated silica, silica gel, or fumed silica is most often used.

In addition to the siliceous filler, finely divided particulate substantially water-insoluble non-siliceous fillers may also be employed. Examples of such optional non-siliceous fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided particulate substantially water-insoluble flame retardant filler such as ethylenebis(tetrabromophthalimide), octabromodiphenyl oxide, decabromodiphenyl oxide, and ethylenebisdibromonorbornane dicarboximide.

The finely divided substantially water-insoluble non-siliceous filler used in the present invention is particulate. As present in the microporous material, the non-siliceous filler may be in the form of ultimate particles, aggregates of ultimate particles, or a combination of both. In most cases, at least about 75 percent by weight of the non-siliceous filler used in preparing the microporous material has gross particle sizes in the ranges of from about 0.1 to about 40 micrometers as determined by use of a Micromeretics Sedigraph 5000-D (Micromeretics Instrument Corp.) in accordance with the accompanying operating manual. The preferred ranges vary from filler to filler. For example, it is preferred that at least about 75 percent by weight of antimony oxide particles be in the range of from about 0.1 to about 3 micrometers, whereas it is preferred that at least about 75 percent by weight of barium sulfate particles be in the range of from about 1 to about 25 micrometers. It is expected that the sizes of filler agglomerates will be reduced during processing of the ingredients to prepare the microporous material. Therefore, the distribution of gross particle sizes in the microporous material may be smaller than in the raw non-siliceous filler itself.

The particularly preferred finely divided particulate substantially water-insoluble siliceous filler is precipitated silica. Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144, the entire disclosure of which is incorporated herein by reference. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a nonprecipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in the U.S. Pat. Nos. 2,940,830 and in 4,681,750, the entire disclosures of which are incorporated herein by reference, including especially the processes for making precipitated silicas and the properties of the products.

In the case of the preferred filler, precipitated silica, the average ultimate particle size (irrespective of whether or not the ultimate particles are agglomerated) is less than about 0.1 micrometer as determined by transmission electron microscopy. Often the average ultimate particle size is less than about 0.05 micrometer. Preferably the average ultimate particle size of the precipitated silica is less than about 0.03 micrometer.

The finely divided particulate substantially water-insoluble filler constitutes from about 50 t 90 percent by weight of the microporous material. Frequently such filler constitutes from about 50 to about 85 percent by weight of the microporous material. From about 60 percent to about 80 percent by weight is preferred.

At least about 50 percent by weight of the finely divided particulate substantially water-insoluble filler is finely divided particulate substantially water-insoluble siliceous filler. In many cases at least about 65 percent by weight of the finely divided particulate substantially water-insoluble filler is siliceous. Often at least about 75 percent by weight of the finely divided particulate substantially water-insoluble filler is siliceous. Frequently at least about 85 percent by weight of the finely divided particulate water-insoluble filler is siliceous. In many instances all of the finely divided particulate water-insoluble filler is siliceous.

Minor amounts, usually less than about 5 percent by weight, of other materials used in processing such as lubricant, processing plasticizer, organic extraction liquid, surfactant, water, and the like, may optionally also be present. Yet other materials introduced for particular purposes may optionally be present in the microporous material in small amounts, usually less than about 15 percent by weight. Examples of such materials include antioxidants, ultraviolet light absorbers, reinforcing fibers such as chopped glass fiber strand, dyes, pigments, and the like. The balance of the microporous material, exclusive of filler and any impregnant applied for one or more special purposes is essentially the thermoplastic organic polymer.

On an impregnant-free basis, pores constitute at least about 35 percent by volume of the microporous material. In many instances the pores constitute at least about 60 percent by volume of the microporous material. Often the pores constitute from at least about 35 percent to about 95 percent by volume of the microporous material. From about 60 percent to about 75 percent by volume is preferred. As used herein and in the claims, the porosity (also known as void volume) of the microporous material, expressed as percent by volume, is determined according to the equation:

Porosity = $100[1 - d_1/d_2]$ where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left(\frac{v_1 r_1}{w_1} + \frac{v_2 r_2}{w_2}\right) / \left(\frac{v_1}{w_1} + \frac{v_2}{w_2}\right)$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally the volume average diameter of the pores is in the range of from about 0.02 to about 50 micrometers. Very often the volume average diameter of the pores is in the range of from about 0.04 to about 40 micrometers. From about 0.05 to about 30 micrometers is preferred.

In the course of determining the volume average pore diameter of the above procedure, the maximum pore radius detected is sometimes noted. This is taken from the low pressure range scan if run; otherwise it is taken from the high pressure range scan. The maximum pore diameter is twice the maximum pore radius.

Microporous material may be produced according to the general principles and procedures of U.S. Pat. No. 3,351,495, the entire disclosure of which is incorporated herein by reference, including especially the processes for making microporous materials and the properties of the products.

Preferably filler, thermoplastic organic polymer powder, processing plasticizer and minor amounts of lubricant and antioxidant are mixed until a substantially uniform mixture is obtained. The weight ratio of filler to polymer powder employed in forming the mixture is essentially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calendar rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are those oils which have a pour point of less than 22° C. according to ASTM D 97-66 (reapproved 1978). Particularly preferred are oils having a pour point of less than 10° C. Examples of suitable oils include Shellflex® 412 and Shellflex® 371 oil (Shell Oil Co.) which are solvent refined and hydrotreated oils derived from naphthenic crude. ASTM D 2226-82 and ASTM D 97-66 (reapproved 1978) are, in the entireties, incorporated herein by reference. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1-2-trichloro-1,2,2-trifluoroethane, isopropyl alcohol, diethyl ether and acetone.

In the above described process for producing microporous material, extrusion and calendering are facilitated when the substantially water-insoluble filler carries much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from about 25 to 350 square meters per gram. ASTM C 819-77 is, in its entirety, incorporated herein by reference. Preferably, but not necessarily, the surface area of any non-siliceous filler used is also in at least one of these ranges.

Inasmuch as it is desirable to essentially retain the filler in the microporous material, it is preferred that the substantially water-insoluble filler be substantially insoluble in the processing plasticizer and substantially insoluble in the organic extraction liquid when microporous material is produced by the above process.

The residual processing plasticizer content is usually less than 5 percent by weight of the microporous sheet and this may be reduced even further by additional extractions using the same or a different organic extraction liquid.

Pores constitute from about 35 to about 80 percent by volume of the microporous material when made by the above-described process. In many cases the pores constitute from about 60 to about 75 percent by volume of the microporous material.

The volume average diameter of the pores of the microporous material when made by the above-described process, is usually in the range of from about 0.02 to about 0.5 micrometers. Frequently the average diameter of the pores is in the range of from about 0.04 to about 0.3 micrometers. From about 0.05 to about 0.25 micrometers is preferred.

The microporous material produced by the above-described process may be used for producing multilayer articles of the present invention. However, it may optionally be stretched and the stretched microporous material used for producing such multilayer articles. When such stretching is employed, the product of the above-described process may be regarded as an intermediate product.

It will be appreciated that the stretching both increases the void volume of the material and induces regions of molecular orientation in the ultrahigh molecular weight (UHMW) polyolefin. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation. Although it is not desired to be bound by any theory, it is believed that the properties of the UHMW polyolefin, the regions of molecular orientation, the high levels of filler loading, and the high degrees of porosity cooperate to provide many of the desirable properties characteristic of the stretched microporous material used in the present invention.

Stretched microporous material may be produced by stretching the intermediate product in at least one stretching direction above the elastic limit. Usually the stretch ratio is at least about 1.5. In many cases the stretch ratio is at least about 1.7. Preferably it is at least about 2. Frequently the stretch ratio is in the range of from about 1.5 to about 15. Often the stretch ratio is in the range of from about 1.7 to about 10. Preferably the stretch ratio is in the range of from about 2 to about 6. As used herein, the stretch ratio is determined by the formula:

$$S = L_2/L_1$$

where S is the stretch ratio, $L_1$ is the distance between two reference points located on the intermediate product and on a line parallel to the stretching direction, and $L_2$ is the distance between the same two reference points located on the stretched microporous material.

The temperatures at which stretching is accomplished may vary widely. Stretching may be accomplished at about ambient room temperature, but usually elevated temperatures are employed. The intermediate product may be heated by any of a wide variety of techniques prior to, during, and/or after stretching. Examples of these techniques include radiative heating such as that provided by electrically heated or gas fired infrared heaters, convective heating such as that provided by recirculating hot air, and conductive heating such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the intermediate product, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the intermediate product is stretched about evenly so that the variations, if any, in film thickness of the stretched microporous material are within acceptable limits and so that the amount of stretched microporous material outside of those limits is acceptably low. It will be apparent that the temperatures used for control purposes may or may not be close to those of the intermediate product itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the intermediate product. Also because of such line speeds, it is impracticable to measure these temperature gradients. The presence of gradients of varying temperatures, when they occur, makes it unreasonable to refer to a single film temperature. Accordingly, film surface temperatures, which can be measured, are best used for characterizing the thermal condition of the intermediate product. These are ordinarily about the same across the width of the intermediate product during stretching although they may be intentionally varied, as for example, to compensate for intermediate product having a wedge-shaped cross-section across the sheet. Film surface temperatures along the length of the sheet may be about the same or they may be different during stretching.

The film surface temperatures at which stretching is accomplished may vary widely, but in general they are such that the intermediate product is stretched about evenly, as explained above. In most cases, the film surface temperatures during stretching are in the range of from about 20° C. to about 220° C. Often such temperatures are in the range of from about 50° C. to about 200° C. From about 75° C. to about 180° C. is preferred.

Stretching may be accomplished in a single step or a plurality of steps as desired. For example, when the intermediate product is to be stretched in a single direction (uniaxial stretching), the stretching may be accomplished by a single stretching step or a sequence of stretching steps until the desired final stretch ratio is attained. Similarly, when the intermediate product is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the intermediate product is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintering, annealing, reeling, unreeling, and the like, may optionally be included in the overall process as desired.

Various types of stretching apparatus are well known and may be used to accomplish stretching of the intermediate product. Uniaxial stretching is usually accomplished by stretching between two rollers wherein the second or downstream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where continuous sheet is being stretched, one stretching direction is at least approximately parallel to the long axis of the sheet (machine direction) and the other stretching direction is at least approximately perpendicular to the machine direction and is in the plane of the sheet (transverse direction).

After stretching has been accomplished, the microporous material may optionally be sintered, annealed, heat set, and/or otherwise heat treated. During these optional steps, the stretched microporous material is usually held under tension so that it will not markedly shrink at the elevated temperatures employed, although some relaxation amounting to a small fraction of the maximum stretch ratio is frequently permitted.

Following stretching and any heat treatments employed, tension is released from the stretched microporous material after the microporous material has been brought to a temperature at which, except for a small amount of elastic recovery amounting to a small fraction of the stretch ratio, it is essentially dimensionally stable in the absence of tension. Elastic recovery under these conditions usually does not amount to more than about 10 percent of the stretch ratio.

The stretched microporous material may then be further processed as desired. Examples of such further processing steps include reeling, cutting, stacking, treatment to remove residual processing plasticizer or extraction solvent, impregnation with various materials, and fabrication into shapes for various end uses.

Stretching is preferably accomplished after substantial removal of the processing plasticizer as described above. For purposes of this invention, however, the calendered sheet may be stretched in at least one stretching direction followed by substantial removal of the processing plasticizer by extraction and substantial removal of the residual organic extraction liquid. It will be appreciated that as stretching may be accomplished in a single step or a plurality of steps, so likewise extraction of the processing plasticizer may be accomplished in a single step or a plurality of steps and removal of the residual organic extraction liquid may be accomplished in a single step or a plurality of steps. The various combinations of the steps stretching, partial stretching, processing plasticizer extraction, partial plasticizer extraction, removal of organic extraction liquid, and partial removal of organic extraction liquid are very numerous, and may be accomplished in any order, provided of course, that a step of processing plasticizer extraction (partial or substantially complete) precedes the first step of residual organic extraction liquid removal (partial or substantially complete). It is expected that varying the orders and numbers of these steps will produce variations in at least some of the physical properties of the stretched microporous product.

In all cases, the porosity of the stretched microporous material is, unless impregnated after stretching, greater than that of the intermediate product. On an impregnant-free basis, pores usually constitute more than 80 percent by volume of the stretched microporous material. In many instances the pores constitute at least about 85 percent by volume of the stretched microporous material. Often the pores constitute from more than 80 percent to about 95 percent by volume of the stretched microporous material. From about 85 percent to about 95 percent by volume is preferred.

Generally the volume average diameter of the pores of the stretched microporous material is in the range of from 0.6 to about 50 micrometers. Very often the volume average diameter of the pores is in the range of from about 1 to about 40 micrometers. From about 2 to about 30 micrometers is preferred.

The microporous material, whether or not stretched, may be printed with a wide variety of printing inks using a wide variety of printing processes. Both the printing inks and the printing processes are themselves conventional. Printing may be accomplished before assembly of the microporous material into multilayer articles of the present invention or after assembly of such multilayer articles.

There are many advantages in using the microporous material described herein as a printing substrate.

One such advantage is that the substrate need not be pretreated with any of the pretreatments customarily used to improve adhesion between the printing ink and polyolefin substrate such as flame treatment, chlorination, or especially corona discharge treatment which is most commonly employed. This is surprising inasmuch as untreated polyolefins such as polyethylene and polypropylene cannot ordinarily be successfully printed because of a lack of adhesion between the polyolefin printing ink and the polyolefin substrate. The microporous material substrates used in the present invention may be pretreated to further improve ink-substrate adhesion, but commercially satisfactory results can ordinarily be attained without employing such methods.

Another advantage is that the microporous material substrates accept a wide variety of printing inks, including most organic solvent-based inks which are incompatible with water, organic solvent-based inks which are compatible with water, and water-based inks.

Yet another advantage is very rapid drying of most inks to the tack-free state upon printing the microporous material substrates. This advantage is quite important in high speed press runs, in multicolor printing, and in reducing or even eliminating blocking of stacks or coils of the printed substrate.

A further advantage is the sharpness of the printed image that can be attained. This is especially important in graphic arts applications where fine lines, detailed drawings, or halftone images are to be printed. Halftone images printed on the microporous material substrates ordinarily exhibit high degrees of dot resolution.

Ink jet printing, especially when a water-based ink jet printing ink is used, is particularly suitable for printing bar codes on microporous material substrates. The resulting bars are sharp and of high resolution, which are important factors in reducing errors when the codes are read by conventional methods and equipment. The ink dries very rapidly when applied, thereby minimizing loss of bar resolution due to smearing in subsequent handling operations.

Microporous material substrate, after being printed with water-based printing ink, has been washed and dried using a conventional household washer and a conventional household drier. It was observed upon completion of the washing and drying operations that the printed colors held fast with no significant fading.

Printing processes, printing equipment, and printing inks have been extensively discussed and documented. Examples of reference works that may be consulted include L. M. Larsen, *Industrial Printing Ink*, Reinhold Publishing Corp., (1962); Kirk-Othmer, *Encyclopedia of Chemical Technology*, 2d Ed., John Wiley & Sons, Inc., Vol. 11, pages 611–632 (1966) and Vol. 16, pages 494–546 (1968); and R. N. Blair, *The Lithgaraphers Manual*, The Graphic Arts Technical Foundation, Inc., 7th Ed. (1983).

For a more detailed description of printing on microporous material of the kind frequently employed in the present invention, see application Ser. No. 238,684, filed Aug. 30, 1988, which is a continuation-in-part of application Ser. No. 42,404, filed Apr. 24, 1987, the entire disclosures of which are incorporated herein by reference.

The microporous material is fusion bonded to at least one layer of substantially nonporous material in the absence of extrinsic intervening adhesive. Substantially nonporous materials are those which are generally impervious to the passage of liquids, gases, and bacteria. On a macroscopic scale, substantially nonporous materials exhibit few if any pores, viz., minute openings through which matter passes. These materials include those customarily recognized and employed for their barrier properties. Examples of suitable materials include substantially nonporous thermoplastic polymeric sheet or film, substantially nonporous metalized thermoplastic polymeric sheet or film, substantially nonporous thermoset polymeric sheet or film, substantially nonporous elastomeric sheet or film, and substantially nonporous metal sheet or foil. Although the substantially nonporous material is most often in the form of sheet, film, or foil, other shapes may be used when desired, such as for example, plates, bars, rods, tubes, and forms of more complex shape. Examples of thermoplastic polymeric materials which are suitable for use include high density polyethylene, low density polyethylene, polypropylene, poly(vinyl chloride), saran, polystyrene, high impact polystyrene, the nylons, the polyesters such as poly(ethylene terephthalate), copolymers of ethylene and acrylic acid, and copolymers of ethylene and methacrylic acid. If desired, all or a portion of the carboxyl groups of carboxyl-containing copolymers may be neutralized with sodium, zinc, or the like. Examples of substantially nonporous thermoplastic sheets or films include extruded substantially nonporous thermoplastic sheet or film, coextruded substantially nonporous thermoplastic sheets or films of differing thermoplastic polymers, and substantially nonporous sheets or films coated with one or more differing themoplastic polymers, and substantially nonporous thermoplastic sheets or films laminated to other thermoplastic sheets or films. An example of a metalized thermoplastic polymeric material is aluminized poly(ethylene terephthalate). Examples of thermoset polymeric materials include thermoset phenol-formaldehyde resin and thermoset melamine-formaldehyde resin. Examples of elastomeric materials include natural rubber, neoprene, styrene-butadiene rubber, acrylonitrile-butadiene-styrene rubber, elastomeric polyurethanes, and elastomeric copolymers of ethylene and propylene. Examples of metals include iron, steel, copper, brass, bronze, chromium, zinc, die metal, aluminum, and cadmium. Most often the metals employed are alloys.

The multilayer article of the present invention may be constructed by fusion bonding at least one layer of microporous material to at least one layer of substantially nonporous material in the absence of extrinsic intervening adhesive. The microporous material usually has, on a macroscopic scale, generally opposed major surfaces such as are characteristic of sheets, films, foils, and plates. The multilayer article may comprise one layer or more than one layer of microporous material and one layer or more than one layer of the substantially nonporous material in the absence of extrinsic intervening adhesive. Most often, but not always, at least one exterior layer is microporous material.

Fusion bonding may be made by conventional techniques such as for example sealing through use of heated rollers, heated bars, heated plates, heated bands, heated wires, flame bonding, radio frequency (RF) sealing, and ultrasonic sealing. Heat sealing is preferred. Solvent bonding may be used where the substantially nonporous material is soluble in the applied solvent at least to the extent that the surface becomes tacky. After the microporous material has been brought into contact with the tacky surface, the solvent is removed to form the fusion bond. Foamable compositions may be foamed in contact with the microporous material to form a fusion bond between the resulting closed cell foam and the microporous material. Films or sheets of thermoplastic may be extruded and while still hot and tacky, brought into contact with the microporous material to form a fusion bond.

The fusion bond may be permanent or peelable, depending upon the bonding technique and/or the nature of the substantially nonporous material employed.

The microporous material may be substantially continuously fusion bonded to the substantially nonporous material, as is usually preferred; or it may be discontinuously fusion bonded to the substantially nonporous material. Examples of discontinuous bonds include bonding areas in the form of one or more spots, patches, strips, stripes, chevrons, undulating stripes, zigzag stripes, open-curved stripes, closed-curved stripes, irregular areas, and the like. When patterns of bonds are involved, they may be random, repetitive, or a combination of both.

The microporous material employed in the present invention is particularly useful for fusion bonding to polyolefins such as polyethylene and polypropylene by heat sealing in the absence of extrinsic intervening adhesive. The fusion bond obtained is ordinarily quite strong which is surprising inasmuch as the lamination of materials to polyolefins is usually difficult unless special adhesives are used. This property of the microporous material used in the present invention makes it especially useful for the in-mold labeling of polyolefin containers and other items manufactured by the blow molding process. In this procedure, labels (usually preprinted) are placed against the sides of the opened mold, the mold is closed, the polyolefin parison is blown to form the labeled container, the mold is opened, and the labeled container is ejected. Similar in-mold labeling techniques may be used with the bag molding, compression molding, and injection molding of polyolefins. While polyethylene (usually low density polyethylene) is most often used in in-mold labeling procedures, the process is applicable to a wide variety of other thermoplastic polymers as well.

The multilayer articles of the present invention have many and varied uses including gaskets, cushion assemblies, signs, printing substrates, substrates for pen and ink drawings, maps (particularly maritime maps), book covers, book pages, wall coverings, and seams, joints, and seals of breathable packages.

The invention is further described in conjunction with the following examples which are to be considered illustrative rather than limiting.

EXAMPLES

Microporous Material Formation

The preparation of the above described materials is illustrated by the following descriptive examples. Processing oil was used as the processing plasticizer. Silica, polymer, lubricant, and antioxidant in the amounts specified in Table I were placed in a high intensity mixer and mixed at high speed for 30 seconds to thoroughly blend the dry ingredients. The processing oil needed to formulate the batch was pumped into the mixer over a period of 2-3 minutes with low speed agitation. After the completion of the processing oil addition a 2 minute low speed mix period was used to distribute the processing oil uniformly throughout the mixture.

TABLE I

| | Formulations Example No. | | | | | | | | | |
|---|---|---|---|---|---|---|---|---|---|---|
| Ingredient | 1 | 2 | 3 | 4 | 5 | 6 | 7 | 8 | 9 | 10 |
| UHMWPE (1), kg | 5.67 | 9.98 | 4.25 | 8.57 | 6.12 | 9.98 | 3.49 | 5.73 | 11.84 | 4.54 |
| Polypropylene (2), kg | 0 | 0 | 1.42 | 0 | 0 | 0 | 0 | 0 | 0 | 0 |
| Polyethylene (3), kg | 0 | 0 | 0 | 0 | 0 | 0 | 0 | 0 | 0 | 4.54 |
| Precipitated Silica (4),kg | 19.96 | 19.96 | 19.96 | 19.96 | 13.02 | 9.98 | 19.96 | 20.17 | 20.87 | 19.96 |
| Silica Gel, kg | 0 | 0 | 0 | 0 | 6.49 | 0 | 0 | 0 | 0 | 0 |
| Clay, kg | 0 | 0 | 0 | 9.98 | 0 | 0 | 0 | 0 | 0 | 0 |
| Lubricant (5), g | 100 | 100 | 100 | 100 | 100 | 50 | 100 | 100 | 100 | 100 |
| Antioxidant (6), g | 100 | 100 | 100 | 100 | 100 | 50 | 100 | 100 | 100 | 100 |
| Processing Oil (7), kg | | | | | | | | | | |
| in Batch | 31.21 | 31.21 | 31.21 | 37.58 | 33.44 | 16.89 | 31.72 | 31.29 | 34.13 | 31.11 |
| at Extruder | 13.61 | 41.59 | 30.39 | 28.60 | ~14 | 18.72 | 13.61 | ~10.96 | ~51.93 | ~16.61 |

(1) UHMWPE = Ultrahigh Molecular Weight Polyethylene, Himont 1900, Himont, U.S.A., Inc.
(2) Profax ® 6801, Himont U.S.A., Inc.
(3) Alathon L-5005, high density, E.I. du Pont de Nemours & Co., Inc.
(4) HiSil ® SBG, PPG Industries, Inc.
(5) Petrac ® CZ81, Desoto, Inc., Chemical Speciality Division
(6) Irganox ® B-215, Ciba-Geigy Corp.
(7) Shellflex ® 412, Shell Chemical Co.

The batch was then conveyed to a ribbon blender where usually it was mixed with up to two additional batches of the same composition. Material was fed from the ribbon blender to a twin screw extruder by a variable rate screw feeder. Additional processing oil was added via a metering pump into the feed throat of the extruder. The extruder mixed and melted the formulation and extruded it through a 76.2 centimeter×0.3175 centimeter slot die. The extruded sheet was then calendered. A description of one type of calender that may be used may be found in the U.S. Pat. No. 4,734,229, the entire disclosure of which is incorporated herein by reference, including the structures of the devices and their modes of operation. Other calenders of different design may alternatively be used; such calenders and their modes of operation are well known to the art. The hot, calendered sheet was then passed around a chill roll to cool the sheet. The rough edges of the cooled calendered sheet were trimmed by rotary knives to the desired width.

The oil filled sheet was conveyed to the extractor unit where it was contacted by both liquid and vaporized 1,1,2-trichloroethylene (TCE). The sheet was transported over a series of rollers in a serpentine fashion to provide multiple, sequential vapor/liquid/vapor contacts. The extraction liquid in the sump was maintained at a temperature of 65°-88° C. Overflow from the sump of the TCE extractor was returned to a still which recovered the TCE and the processing oil for reuse in the process. The bulk of the TCE was extracted from the sheet by steam as the sheet was passed through a second extractor unit. A description of these types of extractors may be found in U.S. Pat. No. 4,648,417, the entire disclosure of which is incorporated herein by reference, including especially the structures of the devices and their modes of operation. The sheet was dried by radiant heat and convective air flow. The dried sheet was wound on cores to provide roll stock for further processing.

The microporous sheets, as well as the hereinafter described biaxially stretched microporous sheets produced therefrom, were tested for various physical properties. Table II identifies the properties with the methods used for their determination. The various ASTM test methods and Method 502 C, referenced in Table II, are, in their entireties, incorporated herein by reference. The results of physical testing of the unstretched microporous sheets are shown in Table III.

Property values indicated by MD (machine direction) were obtained on samples whose major axis was oriented along the length of the sheet. TD (transverse direction; cross machine direction) properties were obtained from samples whose major axis was oriented across the sheet.

TABLE II

| Property | Physical Test Methods Test Method |
|---|---|
| Tensile Strength and Elongation | ASTM D 412-83. |
| Porosity | As described in the text above. |
| Matrix Tensile Strength | Tensile Strength determined in accordance with ASTM D 412-83 multiplied by the quantity 100/(100-Porosity). |
| Tear Strength, Die C | ASTM D 624-81. |
| Processing Oil Content | Method 502 C in "Standard Methods for the Examination of Water and Wastewater", 14th Ed., APHA-AWWA-WPCF (1975). |
| Maximum Pore Diameter | Mercury Porosimetry, as described in the text above. |
| Volume Average Pore Diameter | Mercury Porosimetry, as described in the text above. |
| Gurley Air Flow | ASTM D 726-58 (reapproved 1971), Method A. |
| Mullens Hydrostatic Resistance | ASTM D 751-79, Sec. 30-34, Method A. |
| MVTR (Moisture Vapor Transmission Rate) | ASTM E 96-80. |
| Methanol Bubble Pressure | ASTM F 316-80, using methanol. |
| Maximum Limiting Pore Diameter | ASTM F316-80, using methanol where cy = 22.34 (μm)(kPa). |
| Heat Shrinkage | ASTM D 1204-84, using 15.24 cm × 20.32 cm sample, 1 hr at 100° C. |
| Strip Tensile Strength and Elongation | ASTM D 828-60. |
| Breaking Factor and Elongation | ASTM D 882-83. |

TABLE III

| | Physical Properties of Microporous Sheet | | | | | | | | | |
|---|---|---|---|---|---|---|---|---|---|---|
| Example No. | 1 | 2 | 3 | 4 | 5 | 6 | 7 | 8 | 9 | 10 |
| Thickness, mm | 0.229 | 0.279 | 0.229 | 0.381 | 0.483 | 0.254 | 0.229 | 0.356 | 0.305 | 0.305 |
| Matrix Tensile Strength, MPa | | | | | | | | | | |
| MD | 23.82 | 34.33 | 25.66 | 27.79 | 29.21 | 70.47 | 20.35 | 31.90 | 51.37 | 16.98 |
| TD | 9.94 | 14.91 | 10.38 | 19.05 | 15.55 | 26.39 | 5.97 | 15.82 | 21.25 | 9.85 |
| Elongation at break, % | | | | | | | | | | |
| MD | 250 | 279 | 227 | | | 14 | 110 | 264 | | 371 |
| TD | 108 | 140 | 112 | 546 | 470 | 482 | 214 | 466 | | 99 |
| Tear Strength, kN/m | | | | | | | | | | |
| MD | 36.25 | 61.47 | 47.81 | 56.39 | 57.09 | 93.34 | 24.52 | 53.06 | 87.04 | 82.66 |
| TD | 18.04 | 39.93 | 23.12 | 39.75 | 32.22 | 89.66 | 7.36 | 32.57 | 56.39 | 44.83 |
| Porosity, vol % | 71 | 66 | 68 | 57.9 | 59.3 | 58.9 | 77 | 66 | 66.9 | 62.0 |
| Processing Oil Content, wt % | 4.1 | 2.7 | 2.4 | | | | 2.7 | 2.4 | | 3.1 |
| Maximum Pore Diameter, μm | 0.86 | 0.30 | 0.28 | 1.34 | 6.11 | 0.16 | | | | |
| Volume Average Pore Diameter, μm | 0.11 | 0.065 | 0.069 | 0.099 | 0.111 | 0.12 | | | | |
| Gurley Air Flow, sec/100cc | 904 | 1711 | 955 | | | 4098 | 422 | 1757 | 1792 | 1447 |

Biaxial Stretching of Microporous Sheet

Portions of the microporous materials produced in Examples 1–3 were unwound from cores and biaxially stretched by first uniaxially stretching in the machine direction using a single stage roll-to-roll machine direction stretching (MDS) unit and then essentially uniaxially stretching in the transverse direction using a moving clip tenter frame as a transverse direction stretching (TDS) unit. A preheat roll was employed with the MDS unit to heat the sheet prior to stretching. In the TDS unit, the sheet was heated by banks of infrared radiant heaters. The Preheat and Stretch I Zones of the TDS Unit each contained both upper and lower banks of such heaters. The upper banks were located about 10.16 centimeters above the precursor microporous material while the lower banks were located about 15.24 centimeters below the intermediate product. Electrical power to the heaters of each lower bank was controlled by an on-off controller in response to the difference between a set point and the signal provided by a thermocouple mounted in one heater of the bank. Autotransformers were used to adjust electrical power to the heaters of the upper banks. The Stretch II, Stretch III, Sinter I, and Sinter II Zones each contained upper banks of infrared radiant heaters located about 10.16 centimeters above the intermediate product. There were no lower banks in these zones. Electrical power to the heaters of each upper bank was controlled as described in respect of the heaters of each lower bank in the Preheat and Stretch I Zones. For a description of a typical TDS unit, see FIG. 2 and column 2, lines 43–69, of U.S. Pat. No. 2,823,421, the entire disclosure of which is incorporated herein by reference.

The MDS stretch ratio was varied by controlling the relative peripheral speeds of the feed rolls and the take-off rolls of the MDS unit. The chain track positions in the tenter frame were set to achieve the desired stretch ratio and then to essentially maintain that stretch ratio during sintering. For each of the Examples 11–32, the settings of one of the last four vertical columns in Table IV were employed. The correct column may be ascertained by matching up the TD stretch ratio of the example with the final stretch ratio of the column.

TABLE IV

| | Transverse Direction Stretching | | | | |
|---|---|---|---|---|---|
| Zone | Cumulative Distance from Beginning of Oven, meters | Approximate Transverse Stretch Ratio | | | |
| Preheat | 0 | 1 | 1 | 1 | 1 |
| | 2.794 | 1 | 1 | 1 | 1 |
| Stretch I | | | | | |
| | 4.318 | 1.33 | 1.44 | 1.65 | 1.87 |
| Stretch II | | | | | |
| | 8.890 | 2.31 | 2.75 | 3.62 | 4.49 |
| Stretch III | | | | | |
| | 9.779 | 2.5 | 3 | 4 | 5 |
| Sinter I | | | | | |
| | 11.430 | 2.5 | 3 | 4 | 5 |
| Sinter II | | | | | |
| | 13.716 | 2.5 | 3 | 4 | 5 |

The microporous sheet stock of Examples 1–3 was fed over the preheat roll of the MDS unit which was heated to the temperature indicated in Tables V–VII. The sheet was then stretched to the indicated stretch ratio by maintaining the relative peripheral speeds of the second and first stretch rolls at essentially the same ratio as the stretch ratio. The line speed given in Tables V–VII is the output speed of the MDS unit and the machine direction speed of the TDS unit. The linear feed rate from the roll stock of microporous material to the MDS unit was set at a value given by the line speed divided by the MDS stretch ratio. Thus, with a line speed of 24 m/min and a MDS stretch ratio of 2, the linear feed rate from the roll stock of the MDS unit would be 12 m/min. The properties of several representative examples of biaxially stretched sheets are given in Tables V–VII.

TABLE V

Properties of Biaxially Stretched Microporous Sheets Produced from Microporous Sheet of Example 1

| Example No. | 11 | 12 | 13 | 14 | 15 | 16 | 17 | 18 | 19 |
|---|---|---|---|---|---|---|---|---|---|
| Thickness, mm | 0.178 | 0.152 | 0.127 | 0.076 | 0.076 | 0.102 | 0.127 | 0.102 | 0.076 |
| Stretch Ratio | | | | | | | | | |
| MD | 2 | 2 | 2 | 2 | 3 | 3 | 3 | 3 | 3 |
| TD | 3 | 3 | 4 | 5 | 3 | 3 | 3 | 3 | 4 |
| Line Speed m/min | 48.8 | 24.4 | 24.4 | 24.4 | 24.4 | 24.4 | 24.4 | 24.4 | 24.4 |
| MDS Preheat Temp., °C. | 79 | 79 | 79 | 79 | 79 | 79 | 79 | 79 | 79 |
| TDS Average Zonal Set Point Temps., °C. | | | | | | | | | |
| Preheat (lower banks) | 149 | 177 | 177 | 149 | 149 | 149 | 177 | 149 | 177 |
| Stretch I (lower banks) | 149 | 177 | 177 | 149 | 149 | 149 | 177 | 149 | 177 |
| Stretch II | 189 | 171 | 171 | 189 | 189 | 189 | 171 | 189 | 171 |
| Stretch III | 149 | 142 | 142 | 149 | 149 | 149 | 142 | 149 | 142 |
| Sinter I | 149 | 144 | 144 | 149 | 149 | 149 | 144 | 149 | 144 |
| Sinter II | 204 | 227 | 227 | 204 | 149 | 204 | 227 | 260 | 227 |
| Weight, g/m$^2$ | 27 | 24 | 17 | 14 | 14 | 10 | 14 | 14 | 10 |
| Porosity, vol % | 91 | 90 | 92 | 90 | 89 | 93 | 93 | 93 | 91 |
| Matrix Tensile Strength, MPa | | | | | | | | | |
| MD | 53.70 | 32.96 | 40.25 | 25.30 | 29.52 | 62.74 | 67.77 | 41.96 | 56.69 |
| TD | 40.14 | 29.30 | 65.76 | 46.54 | 61.99 | 45.41 | 43.93 | 57.62 | 55.77 |
| Elongation at break, % | | | | | | | | | |
| MD | 57 | 56 | 60 | 67 | 26 | 23 | 34 | 18 | 33 |
| TD | 27 | 41 | 13 | 9 | 23 | 27 | 30 | 31 | 12 |
| Gurley Air Flow, sec/100cc | 47 | 45 | 40 | 29 | 32 | 28 | 37 | 28 | 36 |
| Tear Strength, kN/m | | | | | | | | | |
| MD | 9.28 | 5.78 | 7.01 | 3.85 | 2.28 | 5.08 | 6.30 | 5.60 | 5.08 |
| TD | 4.90 | 4.90 | 7.01 | 8.23 | 7.53 | 1.93 | 4.38 | 4.55 | 4.73 |
| Mullens Hydrostatic, kPa | 483 | 434 | 490 | 448 | 476 | 503 | 496 | 434 | 510 |
| MVTR, g/m$^2$ day | 935 | | | | | | 963 | | |
| Methanol Bubble Point Pressure, kPa | 290 | 276 | 296 | 234 | 145 | 276 | 324 | 55 | 317 |
| Maximum Limiting Pore Diameter, μm | 0.077 | 0.081 | 0.075 | 0.095 | 0.154 | 0.081 | 0.069 | 0.404 | 0.070 |
| Maximum Pore Diameter, μm | | | | | | | 155 | | |
| Volume Average Pore Diameter, μm | | | | | | | 17.92 | | |
| Heat Shrinkage after 1 hr at 100° C., % | | | | | | | | | |
| MD | 19.0 | | 9.4 | 12.0 | | 19.3 | 24.1 | 21.2 | |
| TD | 23.2 | | 22.5 | 28.3 | | 25.7 | 29.1 | 30.8 | |

The biaxially stretched microporous sheet of Example 17 was examined by scanning electron microscopy at a magnification of 430×. A section taken in a plane perpendicular to the sheet surface (viz., looking into the thickness) and along the machine direction showed substantial pore elongation. A section taken in a plane perpendicular to the sheet surface and along the transverse direction showed pore elongation which was not as pronounced as along the machine direction. A view of the sheet surface (not sectioned) showed that large void structures were not as numerous as in views of either of the sections looking into the thickness.

TABLE VI

Properties of Biaxially Stretched Microporous Materials Produced from Microporous Sheet of Example 2

| Example No. | 20 | 21 | 22 | 23 | 24 | 25 | 26 | 27 | 28 |
|---|---|---|---|---|---|---|---|---|---|
| Thickness, mm | 0.203 | 0.152 | 0.178 | 0.127 | 0.152 | 0.127 | 0.102 | 0.076 | 0.178 |
| Stretch Ratio | | | | | | | | | |
| MD | 2 | 2 | 2 | 2 | 2 | 3 | 3 | 3 | 3 |
| TD | 2.5 | 3 | 3 | 3 | 4 | 3 | 3 | 3 | 4 |
| Line Speed | 24.4 | 24.4 | 15.2 | 24.4 | 15.2 | 24.4 | 15.2 | 24.4 | 15.2 |

TABLE VI-continued

Properties of Biaxially Stretched Microporous Materials Produced from Microporous Sheet of Example 2

| Example No. | 20 | 21 | 22 | 23 | 24 | 25 | 26 | 27 | 28 |
|---|---|---|---|---|---|---|---|---|---|
| m/min MDS Preheat Temp., °C | 104 | 104 | 121 | 79 | 121 | 104 | 121 | 79 | 121 |
| TDS Average Zonal Set Point Temps., °C | | | | | | | | | |
| Preheat (lower banks) | 177 | 177 | 149 | 149 | 149 | 177 | 149 | 149 | 149 |
| Stretch I (lower banks) | 177 | 177 | 149 | 149 | 149 | 177 | 149 | 149 | 149 |
| Stretch II | 171 | 171 | 188 | 188 | 188 | 171 | 188 | 188 | 188 |
| Stretch III | 142 | 142 | 144 | 149 | 144 | 142 | 144 | 149 | 144 |
| Sinter I | 144 | 144 | 200 | 149 | 144 | 144 | 144 | 149 | 144 |
| Sinter II | 227 | 227 | 255 | 316 | 255 | 227 | 255 | 316 | 255 |
| Weight, g/m$^2$ | 44 | 24 | | | 24 | 17 | | 14 | 31 |
| Porosity, vol % | 86 | 90 | | | 90 | 92 | | 90 | 90 |
| Matrix Tensile Strength, MPa | | | | | | | | | |
| MD | 52.94 | 61.50 | | | 36.61 | 96.18 | | 73.91 | 37.51 |
| TD | 44.47 | 67.98 | | | 109.49 | 54.38 | | 75.01 | 117.21 |
| Elongation at break, % | | | | | | | | | |
| MD | 58 | 54 | 161 | 41 | 87 | 31 | 13 | 19 | 111 |
| TD | 51 | 39 | 15 | 16 | 9 | 42 | 16 | 16 | 7 |
| Tear Strength, kN/m | | | | | | | | | |
| MD | 20.31 | 12.61 | 17.51 | 6.13 | 13.13 | 12.26 | 8.41 | 5.95 | 18.56 |
| TD | 13.31 | 12.78 | 21.02 | 7.18 | 11.03 | 9.11 | 5.25 | 7.53 | 19.44 |
| Gurley Air Flow, sec/100cc | 81 | 40 | | | 46 | 45 | | | 52 |
| Mullens Hydrostatic, kPa | 745 | 689 | 676 | 496 | 745 | 717 | 641 | 503 | 703 |
| MVTR, g/m$^2$ day | | | 868 | 761 | | 947 | 913 | 827 | |
| Methanol Bubble Point Pressure, kPa | 290 | 303 | | | 303 | 365 | | | 290 |
| Maximum Limiting Pore Diameter, μm | 0.077 | 0.074 | | | 0.074 | 0.061 | | | 0.077 |
| Maximum Pore Diameter, μm | | 111 | | | | >146 | | | |
| Volume Average Pore Diameter, μm | | 7.13 | | | | 4.70 | | | |
| Heat Shrinkage after 1 hr at 100° C., % | | | | | | | | | |
| MD | 11.7 | | 3.8 | 7.1 | 12.3 | | 15.3 | 6.3 | 7.7 |
| TD | 24.4 | | 23.6 | 11.8 | 22.0 | | 34.1 | 18.9 | 21.5 |

The biaxially stretched microporous sheet of Example 25 was examined by scanning electron microscopy at a magnification of 430×. A section taken in a plane perpendicular to the sheet surface and along the transverse direction showed pore elongation which was not as pronounced as that seen in a similar section taken along the machine direction. A view of the sheet surface (not sectioned) showed that large void structures were not as numerous as in views of either of the sections looking into the thickness.

TABLE VII

Properties of Biaxially Stretched Microporous Sheets Produced from Microporous Sheet of Example 3

| | Example No. | | | |
|---|---|---|---|---|
| | 29 | 30 | 31 | 32 |
| Thickness, mm | 0.178 | 0.102 | 0.127 | 0.102 |
| Stretch Ratio | | | | |
| MD | 2 | 2 | 3 | 3 |
| TD | 3 | 3 | 3 | 4 |
| Line Speed m/min | 24.4 | 24.4 | 24.4 | 24.4 |
| MDS Preheat Temp., °C. | 79 | 79 | 79 | 79 |
| TDS Average Zonal Set Point Temps., °C. | 177 | 149 | 177 | 177 |
| Preheat (lower banks) | | | | |
| Stretch I (lower banks) | 177 | 149 | 177 | 177 |
| Stretch II | 171 | 188 | 171 | 171 |
| Stretch III | 142 | 149 | 142 | 142 |
| Sinter I | 144 | 149 | 144 | 144 |
| Sinter II | 227 | 260 | 227 | 227 |

TABLE VII-continued
Properties of Biaxially Stretched Microporous Sheets Produced from Microporous Sheet of Example 3

| | Example No. | | | |
|---|---|---|---|---|
| | 29 | 30 | 31 | 32 |
| Weight, g/m² | 27 | 14 | 20 | 14 |
| Porosity, vol % | 90 | 91 | 90 | 92 |
| Matrix Tensile Strength, MPa | | | | |
| MD | 29.58 | 52.94 | 77.84 | 109.89 |
| TD | 122.73 | 44.43 | 32.96 | 39.90 |
| Elongation at break, % | | | | |
| MD | 90 | 47 | 27 | 17 |
| TD | 9 | 24 | 32 | 30 |
| Tear Strength, kN/m | | | | |
| MD | 15.41 | 10.51 | 15.24 | 7.18 |
| TD | 21.02 | 5.43 | 4.20 | 3.50 |
| Gurley Air Flow, sec/100cc | 56 | 33 | | 36 |
| Mullens Hydrostatic, kPa | 552 | 655 | 641 | 586 |
| MVTR, g/m² day | 843 | 815 | 862 | 982 |
| Methanol Bubble Point Pressure, kPa | 303 | 276 | | 317 |
| Maximum Limiting Pore Diameter, μm | 0.074 | 0.081 | | 0.070 |
| Heat Shrinkage after 1 hr. at 100° C., % | | | | |
| MD | | 24.1 | 16.5 | 26.4 |
| TD | | 40.1 | 31.4 | 34.8 |

EXAMPLE 33

Microporous material was not taken from a different roll of microporous material produced during the same production run as the microporous material of Example 8. Two sheets 10.2 centimeters wide and several centimeters long were cut from the microporous material. A polyethylene bag which was about 15.2 centimeters wide when flat, was procured. The bag was cut along the width to provide a polyethylene loop which was about 1.6 centimeters wide and about 15.2 centimeters long. The loop was slipped over the end of one of the microporous sheets such that it encircled the microporous sheet across the width dimension near the end of the sheet. The looped portion of the microporous sheet was then superimposed on the end portion of the other microporous sheet. The superimposed layers of the resulting sandwich were therefore in the order: polyethylene - microporous material - polyethylene - microporous material. A PAC Model 24PI Impulse Sealer (Packaging Aids Corporation) fitted with top and bottom heater bands 6.35 millimeters wide was used as a heat sealing unit. The surfaces of the heater bands were covered with polytetrafluoroethylene film to prevent sticking. This unit is an impulse sealer which clamps the heater bands around the package opening with full power to the heater bands for 1.5 seconds. The clamping force is then maintained for 9.5 seconds while the heater bands cool to about ambient temperature. The air pressure setting for providing clamping pressure was 413.7 kilopascals. The sandwich was processed in the heat sealer to form a lap seam. Half of the heat sealed material was processed in the heat sealer a second time. There was in both cases some penetration of polyethylene into the pores of the microporous sheets, but the polyethylene layers still retained their integrity as films. After cooling, the microporous sheets of both samples were pulled in opposite directions perpendicular to the length of the seams to test the seams. In both cases the microporous material drew and eventually broke in the drawn area without failure of the seam. In destructive testing of the seams themselves, the microporous sheet could be peeled away from the polyethylene by pulling parallel to the length of the seam. The surface of the top polyethylene layer showed a whitish cast where some of the microporous material was embedded in the surface. The center polyethylene strip was less well bonded.

This Example establishes that the hot melt concept of heat sealing to polymer which melts or flows more readily at or below the flow temperature of the polymer of the microporous material, produces successful laminations.

EXAMPLE 34

The procedure of Example 33 was repeated except that the microporous material used was that of Example 10. Upon pulling the microporous sheet from the polyethylene, the surface of the polyethylene was whiter than was observed in Example 33, thereby indicating a deeper penetration of polyethylene into the microporous sheet than in Example 33.

EXAMPLE 35

A sample of film about 0.051 millimeter thick which had been produced by the Reynolds Metals Company was obtained. The film was a two-layer composite of Surlyn ® thermoplastic polymer and aluminum. Squares measuring about 5.1 centimeters on a side were cut from the film and from microporous material. The microporous material was from the same source as that used in Example 33. The squares were superimposed with the Surlyn ® thermoplastic polymer side of the composite film adjacent the microporous material, and the sandwich was placed in a 30.5 centimeters by 30.5 centimeter Pasadena press at 105° C. to 110° C. for 30 seconds under essentially no pressure. The film successfully laminated to the microporous material. Attempts to peel the film from the microporous material produced a pull-out of silica onto the polymer side of the composite film, thereby demonstrating that the bond was stronger than the microporous material itself.

EXAMPLE 36

An electrically heated rod was fabricated by inserting a 400 watt quartz heater into a 21 centimeter length of stainless steel tubing having an outside diameter of 12.7 millimeters. The heater was held coaxially within the tubing by wrapping several turns of glass fiber cloth tape 12.7 millimeters wide around each end of the heater prior to insertion. The rod was held in a horizontal position by two asbestos covered clamps which engaged the ends of the rods. The electrical leads from the quartz heater were connected to the secondary of a variable autotransformer. The primary of the autotransformer was connected to standard 110 volt, 60 hertz alternating current. The temperature of the heated rod was measured by holding a dial thermometer in contact with the outside surface of the rod using glass fiber cloth tape. Strips measuring about 2.54 centimeters by about 20.32 centimeters were cut from microporous material and two-layer Surlyn ® thermoplastic polymer and aluminum composite film. The microporous material was from the same source as that used in Example 33 and the two-layer composite film was from the same source as that used in Example 35. The strips were superimposed with the Surlyn ® thermoplastic polymer side of the composite film adjacent the microporous material to form a sandwich. The electrically heated rod was heated to about 150° C. and the sandwich was slowly drawn by hand over the heated rod with the aluminum side next to the surface of the rod. A paper towel folded four times was used to apply pressure to the sandwich and against the rod as the drawing was performed. A good wrinkle-free, uncurled laminate, having no entrapped air bubbles, was obtained. After cooling it was attempted to peel a portion of the composite film from the microporous material. A uniform white coloration on the film side indicated good, uniform adhesion. The white coloration was silica which had been pulled out of the microporous material.

Samples of the microporous material and composite film were taken from the same general regions of the stock from which the strips had been cut and their thicknesses were measured. The thickness of the laminate was also measured. The results were as follows:

| Microporous Material | 0.37084 millimeter |
|---|---|
| Composite Film | 0.0508 millimeter |
| Laminate | 0.381 millimeter |

The laminate is therefore 0.04064 millimeter thinner than the sum of the thicknesses of the layers from which it was produced.

Circles of 17.78 millimeter diameter were die cut from the materials and these were weighed. The results were as follows:

| Microporous Material | 0.0492 gram |
|---|---|
| Composite Film | 0.0160 gram |
| Laminate | 0.0632 gram |

The surface areas of the various materials were determined according to the BET method described in ASTM C 819-77 using nitrogen as the adsorbate but modified by outgassing the system and sample for one hour at 130° C. The results were as follows:

| Microporous Material | 136 m²/g |
|---|---|
| Composite Film | 5 m²/g |
| Laminate | 51 m²/g |

If it is assumed that there was no weight loss of composite film during lamination, then the surface area of the microporous material of the laminate is $(51)(0.0632)/(0.0632-0.0160)=68$ m²/g. If it is alternatively assumed that the BET surface area of the composite film did not change during lamination, then the surface area of the microporous material portions of the laminate is $[(51)(0.0632)-(5)(0.0160)]/[0.0632-0.0160]=67$ m²/g. Based on these data, it is believed that a loss of about half of the BET surface area of the microporous material during lamination was due to a penetration of the Surlyn ® thermoplastic polymer into about half of the thickness of the microporous material used to form the laminate.

Microporous Material Formation

Larger batch mixing equipment was employed than was used for Examples 1-10. Processing oil was used as the processing plasticizer. Silica, polymer, lubricant, and antioxidant in the amounts specified in Table VIII were placed in a high intensity mixer and mixed at high speed for 6 minutes. The processing oil needed to formulate the batch was pumped into the mixer over a period of 12-18 minutes with high speed agitation. After completion of the processing oil addition a 6 minute high speed mix period was used to complete the distribution of the processing oil uniformly throughout the mixture.

TABLE VIII

| | Formulations | | |
|---|---|---|---|
| | Example No. | | |
| Ingredient | 37 | 38 | 39 |
| UHMWPE (1), kg | 24.04 | 17.24 | 17.24 |
| HDPE (2), kg | 0.00 | 6.80 | 6.80 |
| Precipitated Silica (3), kg | 59.87 | 59.87 | 59.87 |
| Lubricant (4), g | 300.0 | 300.0 | 600.0 |
| Antioxidant (5) g | 300.0 | 300.0 | 0.0 |
| (6) g | 0.0 | 0.0 | 100.0 |
| Processing Oil (7), kg | | | |
| in Batch | 91.63 | 91.63 | 91.63 |
| at Extruder | ~35.14 | ~35.14 | ~35.14 |

(1) UHMWPE = Ultrahigh Molecular Weight Polyethylene, Himont 1900, Himont, U.S.A., Inc.
(2) HDPE = High Density Polyethylene Hostalen ® GM 6255, Hoechst Celanese Corp.
(3) HiSil ® SBG, PPG Industries, Inc.
(4) Petrac ® CZ81, Desoto, Inc., Chemical Speciality Division
(5) Irganox ® B-215, Ciba-Geigy Corp.
(6) Irganox ® 1010, Ciba-Geigy Corp.
(7) Shellflex ® 371, Shell Chemical Co.

The batch was then processed according to the general procedures described in respect of Examples 1-10 to form microporous sheets.

The microporous sheets, as well as the hereinafter described biaxially stretched microporous sheets produced therefrom, were tested for various physical properties Table II identifies the properties with the methods used for their determination. The results of physical testing of the unstretched microporous sheets are shown in Table IX. The abbreviations MD and TD have the same meanings previously discussed.

TABLE IX

| Physical Properties of Microporous Sheet | | | |
|---|---|---|---|
| | Example No. | | |
| Ingredient | 37 | 38 | 39 |
| Thickness, mm | 0.267 | 0.254 | 0.255 |
| Strip Tensile Strength, kN/m | | | |
| MD | 3.42 | | |
| TD | 1.52 | | |
| Breaking Factor, kN/m | | | |
| MD | | 3.44 | 3.23 |
| TD | | 1.42 | 1.52 |
| Elongation at break, % | | | |
| MD | 391 | 477 | 688 |
| TD | 448 | 451 | 704 |
| Processing Oil Content, wt % | 2.8 | 3.3 | 3.1 |

Biaxial Stretching of Microporous Sheet

Portions of the microporous materials produced in Examples 37 and 38 were unwound from cores and biaxially stretched by first uniaxially stretching in the machine direction using a single stage roll-to-roll MDS unit and then essentially uniaxially stretching in the traverse direction using a moving clip tenter frame as a TDS unit.

Operation of the MDS unit can be characterized by the temperatures and line speeds shown in Table X.

TABLE X

MDS Unit Parameters

| Roll No. | Function | Diameter, mm | Temperature, °C. | Peripheral Speed, m/min |
|---|---|---|---|---|
| 1 | Preheat | 305 | 116 | 3.84 |
| 2 | Preheat | 305 | 116 | 3.84 |
| 3 | Stretching | 152 | 127 | 3.84 |
| 4 | Stretching | 152 | 127 | 11.52 |
| 5 | Annealing | 305 | 79 | 11.53 |
| 6 | Cooling | 305 | 38 | 11.53 |

The gap between the slow and fast stretching rolls (Rolls 3 and 4, respectively) was 0.533 millimeter.

The TDS unit was a typical chain and clip tentering frame machine. It comprised three contiguous heating zones, each 2.54 meters in length where the beginning of the first heating zone coincided with the entrance to the TDS unit. The microporous sheet was heated by recirculating hot air in the heating zones. The heating zone temperatures are indicated in Table XI, where heating zone numbers increase in the direction of sheet travel.

TABLE XI

Heating Zone Temperature

| Heating Zone | Temperature, °C. |
|---|---|
| 1 | 107 |
| 2 | 116 |
| 3 | 121 |

Stretching was controlled by positioning the tracks in which the chains holding the gripping clips rode. Microporous sheets, which had been uniaxially stretched in the machine direction as described above, were introduced to the TDS unit which had the track geometry shown in Table XII.

TABLE XII

Track Geometry of TDS Unit

| Distance from Entrance, meters | Width, meters |
|---|---|
| −0.30 | 0.53 |
| +1.22 | 0.53 |
| 2.01 | 0.53 |
| 2.74 | 0.74 |
| 3.51 | 0.97 |
| 4.27 | 1.17 |
| 5.03 | 1.38 |
| 5.79 | 1.60 |
| 7.32 | 1.60 |
| 7.92 | 1.57 |

The properties of representative samples of biaxially stretched microporous sheets are given in Table XIII.

TABLE XIII

Properties of Biaxially Stretched Microporous Sheets

| | Example No. | |
|---|---|---|
| | 40 | 41 |
| Microporous Sheet Feedstock, Example No. | 37 | 38 |
| Thickness, mm | 0.228 | 0.250 |
| Stretch Ratio | | |
| MD | 3 | 3 |
| TD | 3 | 3 |
| Line Speed, m/min | 13.4 | 13.4 |
| Weight, g/m² | 19.67 | 21.56 |
| Porosity, vol % | 92.1 | 91.1 |
| Strip Tensile Strength, kN/m | | |
| MD | 1.175 | 1.158 |
| TD | 0.716 | 0.412 |
| Elongation at break, % | | |
| MD | 41 | 39 |
| TD | 54 | 61 |
| Gurley Air Flow, sec/100cc | 41 | 48 |
| Mullens Hydrostatic, kPa | 600 | 579 |

EXAMPLE 42

Stretched microporous material was taken from a roll of stretched microporous material produced in Example 40 and polyethylene was taken from a polyethylene bag. The stretched microporous material was superimposed on aluminum foil and the resulting two-layer assembly was trimmed to form a 21.59 centimeters by 27.94 centimeter rectangle which was then folded in the middle to form a 13.97 centimeter by 21.59 centimeter rectangular four-layer assembly with the layers superimposed in the order aluminum foil - stretched microporous material - stretched microporous material - aluminum foil. The polyethylene was trimmed to form a 12.7 centimeter by 20.32 centimeter rectangular panel which was inserted between the two stretched microporous material layers of the four-layer assembly. The layers of the resulting five-layer assembly were in the order: aluminum foil - stretched microporous material - polyethylene - stretched microporous material - aluminum foil. A 30.48 centimeter Graphic III Laminator (Spiral Binding Company, Inc., Clifton, N.J.), modified by removing the two rolls of plastic sheeting ordinarily employed for laminating documents, was used as a heat sealer. The two heat shoes of the Graphic III Laminator were heated to 160° C. The five-layer assembly was passed over one of the heat shoes while applying pressure with a leather-palm glove to assure good contact with the heat shoe, through the nip of a pair of laminating rolls, and then through the nip of a pair of rubber pull rolls. When the resulting laminate had cooled, the two layers of aluminum foil were peeled off, leaving as the product a three-layer laminate in which the order of the layers were: stretched microporous material - polyethylene - stretched microporous material. In destructive testing of the product, adhesion was tested by attempting to forcibly delaminate the layers by pulling them apart. It was found that failure occurred in the stretched microporous material itself rather than at a polyethylene - stretched micrporous material interface. This indicated that the adhesive bond between layers was stronger than the stretched microporous material.

EXAMPLE 43

The procedure of Example 42 was repeated except that the stretched microporous material used was that produced in Example 41. The results were essentially the same as in Example 42.

Although the present invention has been described with reference to specific details of certain embodiments thereof, it is not intended that such details should be regarded as limitations upon the scope of the invention except insofar as they are included in the accompanying claims.

We claim:

1. A multilayer article comprising material which is impervious to the passage of gas and bacteria fusion bonded in the absence of extrinsic intervening adhesive to microporous material comprising:
   (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof.
   (b) finely divided particulate substantially water-insoluble siliceous filler distributed throughout said matrix, said filler constituting from about 50 percent to about 90 percent by weight of said microporous material, and
   (c) a network of interconnecting pores communicating throughout said microporous material, said pores before fusion bonding constituting at least about 35 percent by volume of said microporous material.

2. The multilayer article of claim 1 wherein
   (a) said essentially linear ultrahigh molecular weight polyolefin is essentially linear ultrahigh molecular weight polyethylene having an intrinsic viscosity of at least about 18 deciliters/gram,
   (b) said siliceous filler is precipitated silica, and
   (c) said pores before fusion bonding constitute from about 35 percent to about 80 percent by volume of said microporous material.

3. The multilayer article of claim 2 wherein said material which is impervious to the passage of gas and bacteria is polyethylene.

4. The multilayer article of claim 3 wherein said polyethylene is heat sealed to said microporous material.

5. A multilayer article comprising at least one layer of substantially nonporous material fusion bonded in the absence of extrinsic intervening adhesive to at least one layer of microporous material comprising:
   (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof,
   (b) finely divided particulate substantially water-insoluble filler, of which at least about 50 percent by weight is siliceous, distributed throughout said matrix, said filler constituting from about 50 percent to about 90 percent by weight of said microporous material, and
   (c) a network of interconnecting pores communicating throughout said microporous material, said pores before fusion bonding constituting at least about 35 percent by volume of said microporous material.

6. The multilayer article of claim 5 wherein said microporous material has a thickness in the range of from about 0.03 to about 4 millimeters.

7. The multilayer article of claim 5 wherein said substantially nonporous material is thermoplastic polymeric sheet or film.

8. The multilayer article of claim 5 wherein said substantially nonporous material is metalized thermoplastic polymeric sheet or film.

9. The multilayer article of claim 5 wherein said substantially nonporous material is thermoset polymeric sheet or film.

10. The multilayer article of claim 5 wherein said substantially nonporous material is elastomeric sheet or film.

11. The multilayer article of claim 5 wherein said substantially nonporous material is metal sheet or foil.

12. The multilayer article of claim 5 wherein said essentially linear ultrahigh molecular weight polyolefin is essentially linear ultrahigh molecular weight polyethylene having an intrinsic viscosity of at least about 18 deciliters/gram.

13. The multilayer article of claim 12 wherein said ultrahigh molecular weight polyethylene has an intrinsic viscosity in the range of from about 18 to about 39 deciliters/gram.

14. The multilayer article of claim 12 wherein said filler constitutes from about 50 percent to about 85 percent by weight of said microporous material.

15. The multilayer article of claim 12 wherein at least about 85 percent by weight of said filler is siliceous.

16. The multilayer article of claim 12 wherein all of said filler is siliceous.

17. The multilayer article of claim 12 wherein said siliceous filler is silica.

18. The multilayer article of claim 12 wherein said siliceous filler is precipitated silica.

19. The multilayer article of claim 18 wherein said precipitated silica has an average ultimate particle size of less than about 0.1 micrometer.

20. The multilayer article of claim 12 wherein the volume average diameter of said pores as determined by mercury porosimetry is in the range of from about 0.02 to about 50 micrometers.

21. The multilayer article of claim 12 wherein said pores constitute from at least about 35 percent to about 95 percent by volume of said microporous material.

22. The multilayer article of claim 12 wherein said pores constitute from about 35 percent to about 80 percent by volume of said microporous material.

23. The multilayer article of claim 12 wherein said pores constitute from more than 80 percent to about 95 percent by volume of said microporous material.

24. The multilayer article of claim 5 wherein said layer of microporous material is heat sealed to said layer of substantially nonporous material.

25. The multilayer article of claim 5 wherein said layer of microporous material is discontinuously fusion bonded to said layer of substantially nonporous material.

26. The multilayer article of claim 5 wherein said layer of microporous material is essentially continuously fusion bonded to said layer of substantially nonporous material.

27. The multilayer article of claim 5 wherein other thermoplastic organic polymer is present in said matrix and wherein at least about 50 percent by weight of said matrix is said essentially linear ultrahigh molecular weight polyolefin.

28. The multilayer article of claim 27 wherein said other thermoplastic organic polymer is polypropylene.

29. The multilayer article of claim 27 wherein said other thermoplastic organic polymer is high density polyethylene.

30. The multilayer article of claim 5 wherein other thermoplastic organic polymer is present in said matrix and wherein at least about 70 percent by weight of said matrix is said essentially linear ultrahigh molecular weight polyolefin.

31. The multilayer article of claim 5 wherein other thermoplastic organic polymer is substantially absent from said matrix.

* * * * *